United States Patent [19]
Jurrens

[11] 3,717,601
[45] Feb. 20, 1973

[54] AMORPHOUS POLYPROPYLENE STABILIZED HOT MELT ADHESIVE

[75] Inventor: Lawrence D. Jurrens, Bartlesville, Okla.

[73] Assignee: Phillips Petroleum Co.

[22] Filed: May 28, 1971

[21] Appl. No.: 148,115

[52] U.S. Cl........260/27 EV, 260/28.5 A, 260/897 A
[51] Int. Cl..................................................C09j 3/26
[58] Field of Search.260/27 EV, 897 A, 28.5 A, 879, 260/880

[56] References Cited

UNITED STATES PATENTS

| | | | |
|---|---|---|---|
| 3,600,347 | 8/1971 | Godar | 260/27 |
| 3,220,966 | 11/1965 | Flanagan | 260/27 |
| 3,360,488 | 12/1967 | Hall | 260/23 |
| 3,539,481 | 11/1970 | Parker | 260/27 |

*Primary Examiner*—Donald E. Czaja
*Assistant Examiner*—William E. Parker
*Attorney*—Young and Quigg

[57] ABSTRACT

Hot melt adhesive compositions with resistance to crusting and stable viscosity characteristics are prepared from a mixture of ethylene-vinyl acetate copolymer, glycerol ester of hydrogenated rosin, wax, and amorphous polypropylene. The improved hot melt adhesive formulation can contain from about 30 to about 50 percent by weight ethylene-vinyl acetate copolymer, from about 20 to about 40 percent by weight of glycerol ester of hydrogenated rosin, from about 20 to about 40 percent by weight of a wax, and from about 10 to about 30 percent by weight amorphous polypropylene.

7 Claims, No Drawings

AMORPHOUS POLYPROPYLENE STABILIZED HOT MELT ADHESIVE

BACKGROUND OF DISCLOSURE

This invention is related to hot melt adhesive compositions. In another aspect, this invention is related to hot melt adhesives having resistance to crust formation. In another aspect, this invention is related to hot melt adhesives having improved resistance to viscosity increase caused by heat aging. In still another aspect, it is related to hot melt adhesive formulations based on amorphous polypropylene.

A hot melt adhesive melts sharply upon heating and flows freely for easy application to the substrate which is to be bonded. Hot melt adhesives are not dependent on cross-linking or other chemical reactions to produce a bond between the substrate materials. The bond is produced upon cooling and is dependent upon the penetration of the surface of the substrate. These adhesives are particularly useful in bonding paper, plastics, textiles, wood and other porous materials. Hot melt adhesives are particularly useful for sealing folding cartons and in the production of corrugated paperboard cartons.

One of the problems frequently associated with hot melt adhesives, particularly those formulations containing ethylene-vinyl acetate copolymers, is a tendency toward increased viscosity on being held at an elevated temperature, as in a hot melt applicator, for an extended length of time. These hot melt adhesives also tend to form a crust on the surface of the hot melt adhesive upon heat aging in the hot melt applicator. This crust is particularly bothersome in breaking and plugging the applicator during the operation of applying the hot melt adhesive to a surface. Accordingly, I have now discovered useful hot melt adhesive formulations based on the combination of a low molecular weight amorphous polypropylene and an ethylene-vinyl acetate copolymer which have increased resistance to viscosity increase on heat aging and to the formation of a crust.

An object of this invention is to provide hot melt adhesive compositions which do not form a crust when subjected to heat aging.

Other aspects, objects as well as the several advantages of this invention will be apparent to those skilled in the art upon reading the specification and the appended claims.

SUMMARY OF THE INVENTION

In accordance with this invention, hot melt adhesive compositions with superior resistance to heat aging are prepared by combining amorphous polypropylene having a molecular weight of less than 10,000, an ethylene-vinyl acetate copolymer, a wax and a glycerol ester of a hydrogenated rosin. I have found that compositions of my invention can be held at elevated temperatures in a hot melt applicator without materially changing the viscosity and without formation of a crust. Thus, these compositions have the distinct advantage of added ease of application over ethylene-vinyl acetate copolymer based hot melt adhesives currently in use.

The ethylene-vinyl acetate copolymers suitable for this invention can be any copolymer having in the range from about 10 to about 35 percent vinyl acetate in the copolymer. A presently preferred copolymer contains about 17 to about 19 percent vinyl acetate in the copolymer. The ethylene-vinyl acetate copolymer can comprise from about 30 to about 50 weight percent of the total composition. It is presently preferred that about 35 to about 45 percent by weight of the total composition be comprised of ethylene-vinyl acetate copolymer.

Suitable rosin tackifiers can be employed in the hot melt adhesive compositions of this invention including natural rosins, such as gum rosin, wood rosin, and tall oil rosin; hydrogenated rosins, such as hydrogenated wood, gum, and tall oil rosins; esters of rosins, such as methyl and glycerol esters of wood rosin, gum rosin and hydrogenated rosin. A glycerol ester of hydrogenated rosin is the preferred rosin tackifier for use in this invention. Rosin tackifier can advantageously be added in amounts ranging from 20 to about 40 percent by weight of the total composition, preferably in the range of about 25 to about 35 percent by weight.

Waxes and wax-like materials including, for example, petroleum waxes, such as paraffin and microcrystalline wax, or synthetic waxes such as Fischer-Tropsch wax are advantageously added to compositions of this invention in amounts ranging from about 20 to about 40 percent by weight of the total composition. A preferred range for these additives is from about 25 to about 35 percent by weight of the total composition.

The noncrystalline polypropylene suitable for this invention has a molecular weight, calculated from intrinsic viscosity, of less than 10,000 preferably in the range of 7,000 to 8,000 and is soluble in hydrocarbon solvent such as pentene at the boiling point. This material has a crystallinity of less than about 5 percent. The amorphous polypropylene makes up from about 10 to about 30 percent by weight of the total formulation. Preferably from about 15 to about 25 percent by weight of the formulation is amorphous polypropylene.

An antioxidant or antioxidant formulation can be added to the hot melt adhesive composition if desired. A finite amount of antioxidant up to about 0.5 weight percent of the total hot melt adhesive composition has been found to be effective. A butylated hydroxytoluene produced commercially has been found to be a particularly effective antioxidant (available from Hercules Inc. under the designation Dalpac R).

Mixing the components can be carried out in any suitable manner which continues the mixing at a temperature elevated sufficiently to maintain the components in a molten state until the adhesive composition is homogeneous. Satisfactory mixing can be accomplished with a heated blade mixer or in a container maintained in an oil bath at a temperature between 390° and 455°F.

The following examples of the formulation of the adhesive of this invention, the description of the test procedures and the data derived therefrom are meant to be exemplary and are not exclusive.

EXAMPLE I

Adhesive formulations were prepared by melting the component in a stainless steel beaker heated in an oil bath maintained at a temperature of 400°F. Elvax 410, a polyethylene-vinyl acetate copolymer containing 17 to 19 percent by weight vinyl acetate made by DuPont, Staybelite Ester 10, a glycerol ester of hydrogenated rosin made by Hercules, and a paraffin wax melting at 150°F were combined with agitation until a homogeneous blend was attained. Where applicable, additional paraffin wax or amorphous polypropylene having an average molecular weight of about 7,500 were added in amounts to achieve the proportions shown in the tables below. 0.3 weight percent butylated hydroxy toluene was added as antioxidant to each formulation (Dalpac R, Hercules Inc.).

EXAMPLE II

Samples of the material prepared as in Example I were placed in 400 milliliter stainless steel beakers and aged in an air-draft oven for 100 hours at 350°F. The tables below show the results of these tests.

TABLE I

| Adhesive Formulation Percent by Weight | | | | Init. Visc. at 350°F | Visc. At 350°F after 100 Hrs. at 350°F. | Crust Formation |
|---|---|---|---|---|---|---|
| A | B | C | D | | | |
| 40 | 30 | 30 | | 512 | 524 | Hard Crust |
| 35 | 40 | 25 | | 280 | 280 | Hard Crust |
| 35 | 25 | 25 | 15 | 400 | 368 | No Crust |

A ethylene-vinyl acetate copolymer
B paraffin wax
C glycerol ester of hydrogenated rosin
D amorphous polypropylene The table above illustrates that a hard crust forms on a melt adhesive sample after heat aging using a melt adhesive sample composed of the standard formulation of ethylene-vinyl acetate copolymer, paraffin and a glycerol ester of hydrogenated rosin. Increasing the relative amount of paraffin wax improves the viscosity on heat aging but does not stop the formation of a crust. The addition of amorphous polypropylene to the formulation prevents the formation of a crust after heat aging without increasing the viscosity.

TABLE II

| adhesive formulation Percent by Weight | | | | init. visc. | Visc. after 100 hrs. at 350°F | crust formation |
|---|---|---|---|---|---|---|
| A | B | C | D | | | |
| 40 | 30 | 30 | | 6720 320°F | 6800 320°F | hard |
|  |  |  |  | 6000 330°F | 5840 330°F | crust |
|  |  |  |  | 5200 340°F | 5360 340°F |  |
| 37 | 27 | 27 | 9 | 5920 320°F | 5360 320°F | hard |
|  |  |  |  | 5120 330°F | 4800 330°F | crust |
|  |  |  |  | 4400 340°F | 4480 340°F |  |
| 32 | 24 | 24 | 20 | 4800 320°F | 4640 320°F | No |
|  |  |  |  | 4240 330°F | 4000 330°F | crust |
|  |  |  |  | 3600 340°F | 3280 340°F |  |

A ethylene-vinyl acetate copolymer
B paraffin wax
C glycerol ester of hydrogenated rosin
D amorphous polypropylene This table illustrates the prevention of crust formation by increased addition of amorphous polypropylene without materially altering the viscosity of the melt even after prolonged aging.

TABLE III

| adhesive formulation percent by weight | | | | init. visc. | visc. after 100 hrs. | crust formation |
|---|---|---|---|---|---|---|
| A | B | C | D | | | |
| 37 | 27 | 27 | 9 | 4400 340°F | 4480 340°F | hard crust |
| 35 | 25 | 25 | 15 | 4000 350°F | 3680 350°F | no crust |
| 32 | 24 | 24 | 20 | 3600 340°F | 3280 340°F | no crust |

A ethylene-vinyl acetate copolymer
B paraffin wax
C glycerol ester of hydrogenated rosin
D amorphous polypropylene The table above illustrates the prevention of formation of crust after heat aging by including amorphous polypropylene in a hot melt adhesive formulation using the ranges prescribed in this invention, without effecting any material change in viscosity.

Reasonable variation and modification are possible within the scope of the foregoing disclosure, and the appended claims to the invention the essence of which is that there has been provided a hot melt adhesive composition with improved heat aging characteristics and prevention of crust formation based on a mixture of amorphous polypropylene, ethylene-vinyl acetate copolymer, wax, and glycerol ester of hydrogenated rosin.

I claim:

1. A hot melt adhesive composition comprising (1) about 10 to about 30 percent by weight amorphous polypropylene having a molecular weight of less than 10,000; (2) about 20 to about 40 percent by weight of a wax; (3) about 20 to about 40 percent by weight of a rosin tackifier and (4) about 30 to about 50 percent by weight of an ethylene-vinyl acetate copolymer.

2. The hot melt adhesive composition of claim 1 wherein an antioxidant formulation in the range of up to 0.5 percent by weight of the total weight of the formulation is present in the composition.

3. A hot melt adhesive composition of claim 1 wherein the amorphous polypropylene has a molecular weight in the range of 7,000 to 8,000 and has a crystallinity of less than 5 percent.

4. A hot melt adhesive composition of claim 1 wherein the ethylene-vinyl acetate copolymer contains about 17 to about 19 percent vinyl acetate.

5. A hot melt adhesive composition of claim 1 comprising about 30 to about 40 percent by weight ethylene-vinyl acetate copolymer, about 20 to about 30 percent by weight paraffin wax, about 20 to about 30 percent by weight rosin tackifier and about 15 to about 25 percent by weight amorphous polypropylene.

6. A hot melt adhesive composition of claim 1 comprising 32 percent by weight ethylene-vinyl acetate copolymer, 24 percent by weight paraffin wax, 24 percent by weight glycerol ester of hydrogenated rosin, and 20 percent by weight amorphous polypropylene.

7. A hot melt adhesive composition of claim 1 comprising 35 percent by weight ethylene-vinyl acetate copolymer, 25 percent by weight paraffin wax, 25 percent by weight glycerol ester of hydrogenated rosin, and 15 percent by weight amorphous polypropylene.

* * * * *